United States Patent Office 3,523,764
Patented Aug. 11, 1970

3,523,764
PROCESS FOR THE MANUFACTURE OF MAGNESIUM ALUMINOSILICATE FOR MEDICAL USES
Hidetaka Uoda, Shinminato-shi, Matajiro Ohsaka, Imizugun, Toyama-ken, and Minoru Okuda, Toyama-shi, Japan, assignors to Fuji Kagaku Kogyo Kabushiki Kaisha, Toyama-ken, Japan, a company of Japan
No Drawing. Filed Dec. 27, 1966, Ser. No. 604,612
Claims priority, application Japan, Dec. 27, 1965, 40/81,133
Int. Cl. C01f 5/00, 7/00; C01b 33/28
U.S. Cl. 23—315                    5 Claims

ABSTRACT OF THE DISCLOSURE

A novel magnesium aluminosilicate of the following structure:

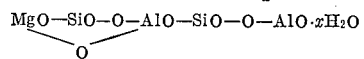

to be used as an antacid for medical application, and a process for preparing the compound by reacting slurries containing equivalent amounts of freshly produced basic sodium magnesium silicate and dibasic aluminum silicate, under vigorous stirring, at temperatures ranging from normal to about 70° C., for several hours, allowing the precipitate formed to settle, withdrawing the supernatant liquid, and drying.

---

Magnesium aluminosilicate represented by the formula $MgO \cdot Al_2O_3 \cdot 2SiO_2 \cdot xH_2O$ is widely used for the treatment of disorders of the digestive tract as an excellent antacid because of its strong neutralizing capacity and buffering effect, which is sustained for a long time since it is not absorbed. Moreover, it does not generate carbon dioxide, avoiding thus the discomfort of belching.

According to a known method for the manufacture of the magnesium aluminosilicate, having the above composition, magnesium salt is either reacted with sodium aluminosilicate or sodium silicate with diacidic magnesium aluminate, according to equations of illustrating the process as follows:

$Al_2(SO_4)_3 + 8NaOH \rightarrow 2Na[AlO_3H_2] + 3Na_2SO_4 + 2H_2O$
$2Na[AlO_3H_2] + 2Na_2SiO_3 \rightarrow 2Na[AlSiO_4] + 4NaOH$
$MgCl_2 + 2NaOH \rightarrow Mg(OH)_2 + 2NaCl$
$2Na[AlSiO_3] + Mg(OH)_2 \rightarrow Mg[AlSiO_4]_2 + 2NaOH$

\* \* \* \* \*

$Al_2(SO_4)_3 + 8NaOH + MgCl_2 \rightarrow$
$\qquad Mg[AlO_3H_2]_2 + 3Na_2SO_4 + 2NaCl + 2H_2O$
$Mg[AlO_3H_2]_2 + 2Na_2SiO_3 \rightarrow Mg[AlSiO_4]_2 + 4NaOH$ The products obtained by the processes described above are all magnesium complex salts of aluminosilicate, having the following chemical structure:

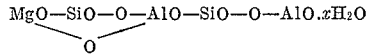

The above reactions take an extremely long time, a very large volume of water, and a great deal of labor for the completion and for the purification of the final reaction mixture in order to obtain the magnesium aluminosilicate of the said chemical structure shown, thus causing a serious bottleneck for its mass production.

It is therefore the object of the invention to provide a combination of aluminum, magnesium and silicon of a structure, which while being different from the magnesium aluminosilicate hitherto in use, would not exhibit a change in antacid activity, and which could be made by a much simpler method.

The magnesium aluminosilicate of the invention is of a novel structure in which magnesium is combined directly to the silicate base on the one hand and to the aluminum base on the other, whereas in the old structure magnesium is combined with both aluminosilicate complex ions.

The novel structure is therefore represented as follows:

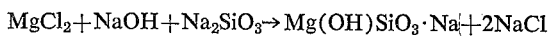

The process of the present invention is to react while stirring, with or without heating, the equivalents of freshly produced basic magnesium sodium silicate and dibasic aluminum silicate by reacting aqueous solutions of caustic soda and sodium silicate, respectively, with an aqueous solution of a water-soluble magnesium salt and with an aqueous solution of a water-soluble aluminum salt and or to react the equivalents of basic silicates having the same composition to be produced during the reaction process. In other word, the slurry corresponding to basic magnesium aluminum silicate can be obtained by adding an aqueous solution of sodium hydroxide, with stirring, to a water-soluble magnesium salt, equivalent to 1 mol of MgO; e.g. the solution of magnesium sulfate or magnesium chloride, etc., which react thereafter with an aqueous solution of sodium silicate equivalent to 1 mol of $SiO_2$ so that the sum of $Na_2O$ including $Na_2O$ in sodium silicate esuivalent to 1 mol of $SiO_2$ comes to 1.5 mols. The reaction as illustrated below.

$MgCl_2 + NaOH + Na_2SiO_3 \rightarrow Mg(OH)SiO_3 \cdot Na + 2NaCl$

The slurry corresponding to a composition of dibasic aluminum silicate can also be readily produced by adding, with stirring, an aqueous solution of sodium hydroxide to a water-soluble aluminum salt equivalent to 1 mol of $Al_2O_3$; e.g. an aqueous solution of aluminum sulfate or aluminum chloride, with which is reacted an aqueous solution of sodium silicate equivalent to 1 mol of $SiO_2$ so that the sum of $Na_2O$ will be 3 mols including $Na_2O$ contained in the sodium silicate corresponding to 1 mol of $SiO_2$ see equations below.

$Al_2(SO_4)_3 + 4NaOH + Na_2SiO_3 \rightarrow$
$\qquad Al(OH)_2 \cdot SiO_3 \cdot Al(OH)_2 + 3Na_2SO_4$ Then, when mixing both slurries of basic silicates thus produced and reacting them while stirring with or without heating, hydrate of the novel magnesium aluminosilicate is synthetized that is the object of this invention.

$Mg(OH) \cdot SiO_3Na + Al(OH)_2 \cdot SiO_3 \cdot Al(OH)_2 \rightarrow$
$\qquad Mg(OH) \cdot SiO_3 \cdot Al(OH) \cdot SiO_3Al(OH)_2 + NaOH$ In the meantime, when adding, with stirring, an aqueous solution of sodium hydroxide to the aqueous mixture of magnesium and aluminum salts referred to above, corresponding to 1 mol of MgO and $Al_2O_3$ respectively, so that the sum of $Na_2O$ comes to 4 mols including $Na_2O$ in the sodium silicate equivalent to 2 mols of $SiO_2$, followed by the addition of an aqueous solution of sodium silicate, corresponding to 2 mols of $SiO_2$, the slurries having the compositions corresponding to basic sodium magnesium silicate and to dibasic aluminum silicate respectively are simultaneously produced and both of them are then condensed for reaction on the spot.

$MgCl_2 + Al_2(SO_4)_3 + 4NaOH + 2Na_2SiO_3 \rightarrow Mg(OH) \cdot$
$\qquad SiO_3 \cdot Al(OH) \cdot SiO_3 \cdot Al(OH)_2 + 3Na_2SO_4 + 2NaCl$ Accordingly, the operation becomes so simple and easy, and further since the sodium hydroxide produced as by-product at the last step of the condensation can be utilized for the neutralization in the first part of the reaction, the material cost can be cut down considerably to the advantage of the large-scale manufacture.

The completion of the reaction can be readily judged by the change of the pH in the liquid phase of the reaction mixture and in the meantime the reaction velocity is extremely high and the reaction is completed in a few hours even when carried out at normal temperature; it can be further shortened by heating.

However, when heated excessively the product obtained is of a less desirable quality namely heavy and hard, and the acid-neutralizing capacity is also lowered. It is therefore desirable that the heating temperature does not exceed 70° C. After the completion of the reaction, the reaction mixture is filtered, washed with water to remove the impurities produced as by-product, dried at 105–110° C., and pulverized. Thus, the magnesium aluminosilicate corresponding to a composition of $MgO \cdot Al_2O_3 \cdot 2SiO_2 \cdot xH_2O$ is obtained as a white amorphous powder.

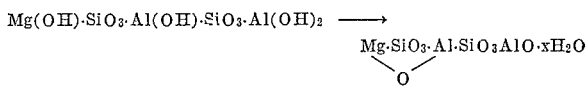

The magnesium alminosilicate obtained by the process of this invention is a compound of a novel chemical structure as mentioned above as it is apparent from the reaction process; furthermore it is dissolved almost completely in 0.1 N hydrochloric acid and has an excellent acid-neutralizing capacity and superior buffering effect compared with the product obtained by the old method.

The following table shows the comparison between both products as to the acid consuming power of 1 gm. each of the products as well as the results of Fuch's test.

|  | Acid-consuming power ml. | Time (min.) | Fuch's test (ph value) | | | | | | | | | |
|---|---|---|---|---|---|---|---|---|---|---|---|---|
|  |  |  | 1 | 3 | 5 | 10 | 20 | 30 | 40 | 50 | 60 | 70 |
| New product | 240 | pH | 3.4 | 3.55 | 3.55 | 3.6 | 3.4 | 3.2 | 3.1 | 3.0 | 2.7 | 1.7 |
| Old product | 235 | pH | 3.3 | 3.5 | 3.6 | 3.5 | 3.4 | 3.2 | 3.1 | 3.0 | 2.9 | 1.9 |

In this way, the product having absolutely the same properties as the old one is obtained by the process of this invention, but as compared with the old method the cost of raw materials is remarkably reduced, the time required to complete the reaction is considerably shortened, the purification becomes simple and easy, the yield is improved and no variation of the composition of the final product is brought about. It is for this reason that the process of this invention is considered as a remarkable improvement both from the viewpoint of the quality control, and the lowering of manufacturing costs. This is shown by the following analysis of costs of materials and procedural expenses.

According to the method of this invention, the amount of caustic soda needed to obtain 1 mol of the magnesium aluminosilicate from the aluminum salt employed as raw material is 4 mols, whereas it is 8 mols according to the old method as is shown in the reaction equations referred to above; thus the amount of caustic soda standing first in the cost of the raw materials for the manufacture of the compound here discussed, can be reduced to half the amount needed in the old method, thereby lowering the cost of the raw materials remarkably. Further, it is a shortcoming of the old method which is always carried out in alkaline medium with a large quantity of the caustic soda being produced as by-product as the reaction proceeds; namely 4 mols per 1 mol of the desired product, that an elaborate process is needed for completely eliminating the by-product by successive washing operation before the reaction is concluded. Moreover, the magnesium aluminosilicate accumulated as precipitate, is of superfine particle size, therefore, very slow in the sedimentation rate; besides, since it has a very strong adsorptive power, it adsorbs the by-products produced during the reaction process, especially the caustic soda, thus requiring again a huge volume of water and many hours not only to complete the reaction, but also to purify the reaction product. On the other hand, according to the method of this invention all the raw materials are employed stoichiometrically and the reaction velocity is high. Further, as the resultant solution is neutral when the reaction is completed and does not contain free caustic soda as impurity, the purification can be achieved very easily. Moreover, according to the old method the reaction solution, which is alkaline, must be repeatedly washed with water until it becomes neutral in order to speed up the reaction and to purify the reaction mixture; as a consequence, silioic acid and aluminum are washed away in large quantities, thereby automatically lowering the yield and causing the change in composition, while according to the method of this invention, as the reaction process is quite different and the constituents are never washed away, not only is the yield increased, but also the composition can be kept constant, so that it becomes very easy to control the quality.

As stated above, according to the method of this invention the magnesium aluminosilicate of the novel structure having exactly the same components and effects as the old product, can be very easily and economically produced and accordingly this invention is considered to bring about an important improvement in the process for the manufacture of magnesium aluminosilicate for medical use.

EXAMPLE 1

203 g. of magnesium chloride of the quality used as food additive containing 46 percent $MgCl_2$ is dissolved in 600 ml. of water, to which 96 g. of caustic soda dissolved in 250 ml. of water is added with stirring, and a solution comprising 50 ml. of water with 207 g. of JIS No. 3 sodium silicate is further added and is then vigorously stirred to produce basic sodium magnesium silicate (which is designated as Slurry A). Ssecondly, 593 g. of JIS Special No. 1 aluminum sulfate containing 17.2 percent $Al_2O_3$ dissolved in 1,700 ml. of water is slowly added with stirring to 216 g. of caustic soda dissolved in 600 ml. of water, to which 50 ml. of water added to 207 g. of JIS No. 3 sodium silicate ($Na_2O$ 9%, $SiO_2$ 29%) is slowly added and is then vigorously stirred to produce tetrabasic dialuminum silicate (which is designated as Slurry B). Mix Slurry A with Slurry B and mix while vigorously stirring for 3 hours at normal temperature. The thus obtained white gel-like precipitate is washed by decantation to remove free alkali, mirabilite (sodium sulfate), sodium chloride, etc. produced as reaction by-products. The residue is filtered and dried at 105 to 110° C., and 340 g. of white powder of fine particle size is obtained as the final product. The molar ratios of MgO to $Al_2O_3$ to $SiO_2$ in this product were approximately 1:1:2.

EXAMPLE 2

203 g. of magnesium chloride of the quality used as food additive, containing 46 percent $MgCl_2$ and 593 g. of JIS Special No. 1 aluminum sulfate containing 17.2 percent $Al_2O_3$, are dissolved in 2,300 ml. of water, to which a solution comprising 272 g. of caustic soda with 800 ml. of water is slowly added with stirring. Thereafter, a solution comprising 414 g. of JIS No. 3 sodium silicate ($Na_2O$ 9%, $SiO_2$ 29%) with 100 ml. of water is poured in, heated and stirring is continued for five hours, while keeping the temperature at 60° C. When the reaction mixture becomes neutral, allow to cool and to stand, withdraw the supernatant fluid and wash the white gel-like precipitate by decantation to remove the impurities; then the mass is dried at 105 to 110° C. whereby 350 g. of a white powder of fine particle size is obtained as the final product.

What we claim is:

1. A novel magnesium aluminosilicate of the formula

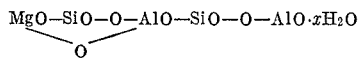

2. A process for preparing the magnesium aluminosilicate according to claim 1, which comprises reacting slurries containing equivalent amounts of freshly produced basic sodium magnesium silicate and dibasic aluminum silicate, under vigorous stirring, at temperatures ranging from normal to about 70° C., for several hours, allowing the precipitate formed to settle, withdrawing the supernatant liquid and drying.

3. The process, according to claim 2, wherein the slurry of basic sodium magnesium silicate is obtained by adding an aqueous solution of sodium hydroxide to a water soluble magnesium salt, equivalent to 1 mol of MgO, and reacting it with an aqueous solution of sodium silicate equivalent to 1 mol $SiO_2$; and the slurry of dibasic aluminum silicate is obtained by adding an aqueous sodium hydroxide solution to a water soluble aluminum salt equivalent to 1 mol $Al_2O_3$ and reacting it with an aqueous sodium silicate solution equivalent to 1 mol $SiO_2$, whereby the total $Na_2O$ content will be 3 mols.

4. A novel magnesium aluminosilicate of formula

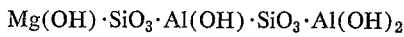

5. The process for the production of the compound according to claim 1 which consists of heating the compound of formula

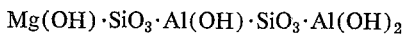

at a temperature of 105–110° C.

References Cited

UNITED STATES PATENTS 3,032,394    5/1962    Ishino et al. _____ 23—110

FOREIGN PATENTS 614,384    2/1961    Canada.

OSCAR R. VERTIZ, Primary Examiner

H. S. MILLER, Assistant Examiner

U.S. Cl. X.R.

23—113; 424—154